United States Patent [19]

Isozaki et al.

[11] Patent Number: 5,426,135

[45] Date of Patent: Jun. 20, 1995

[54] COMPOSITION FOR FORMING SOIL PREVENTING COATING

[75] Inventors: Osamu Isozaki, Yokohama; Kiyoshi Nanishi; Hisashi Isaka, both of Hiratsuka, all of Japan

[73] Assignee: Kansai Paint Company, Limited, Amagasaki, Japan

[21] Appl. No.: 177,934

[22] Filed: Jan. 6, 1994

Related U.S. Application Data

[62] Division of Ser. No. 761,564, Sep. 18, 1991, abandoned.

Foreign Application Priority Data

Sep. 19, 1990 [JP] Japan .................. 2-249141
Oct. 1, 1990 [JP] Japan .................. 2-263530

[51] Int. Cl.$^6$ .............................................. C09D 5/16
[52] U.S. Cl. ..................... 523/122; 524/506; 525/100; 427/387
[58] Field of Search ............... 523/122; 525/100, 103; 524/506; 427/387

[56] References Cited

U.S. PATENT DOCUMENTS

| | | | |
|---|---|---|---|
| 3,523,930 | 8/1970 | Maloney | 525/329.7 |
| 3,631,156 | 12/1971 | Vaughn et al. | 525/386 |
| 3,631,157 | 12/1971 | Vaughn et al. | 525/383 |
| 3,896,753 | 7/1975 | Sheperd | 523/122 |

*Primary Examiner*—Ralph H. Dean
*Attorney, Agent, or Firm*—Armstrong, Westerman, Hattori, McLeland & Naughton

[57] ABSTRACT

The present invention provides a soil preventing coating forming composition which consists essentially of a resin having at least two acid anhydride groups in the molecule on the average, the acid anhydride groups being represented by the formula $$-\overset{O}{\underset{\|}{C}}-O-\overset{O}{\underset{\|}{C}}-R \qquad (I)$$

wherein R is a $C_{1-40}$ monovalent hydrocarbon group or a monovalent chain polysiloxane group represented by the formula $$-C_nH_{2n}-(SiO)_m-(SiO)_p-Si-R_6 \qquad (II)$$

with substituents $R_1, R_2, R_3, R_4, R_5, R_6, R_7$ wherein $R_1$ and $R_2$ are the same or different and are each alkyl, cycloalkyl, aryl, aralkyl or $$-O-(SiO)_q-Si-R_6$$

with substituents $R_3, R_4, R_5, R_7$ group, $R_3$, $R_4$, $R_5$, $R_6$ and $R_7$ are the same or different and are each alkyl, cycloalkyl, aryl or aralkyl, n is an integer of 1 to 6, m is an integer of 0 or 1, p is an integer of 2 to 50, and q is an integer of 0 to 50.

6 Claims, No Drawings

COMPOSITION FOR FORMING SOIL PREVENTING COATING

This is a division of application Ser. No. 07/761,564, filed Sep. 18, 1991, now abandoned.

BACKGROUND OF THE INVENTION

The present invention relates to compositions for forming soil preventing coatings.

The submerged portions of ships and marine structures are usually coated with soil preventing coating compositions so as to prevent corrosion or decreases in the speed of navigation of ships due to the deposition of marine organisms such as barnacles, polyzoa, ascidians and seaweed. Such soil preventing coating compositions are applied also to culture nets to preclude lethal damage to fishes and shellfishes due to the deposition of marine organisms. These compositions include those comprising a polymer, rosin, plasticizer and like vehicle components and a soil preventing agent, and those comprising a polymer of organotin-containing unsaturated monomer or a copolymer of such monomers as disclosed, for example, in Examined Japanese Patent Publications 21426/1965, 9579/1969 and 12049/1976.

The former compositions exhibit a soil preventing effect due to the dissolving out of the rosin and the soil preventing agent contained in the coating formed by the composition, whereas when the amount of insolubles of the coating increases during a prolonged period of submersion, the coating becomes rough-surfaced and less effective for preventing deposition of marine organisms. The latter compositions form a coating containing an organotin compound which is introduced into the polymer through an ester bond. When the coating is degraded by seawater, the ester bond undergoes hydrolysis, releasing the organotin compound and producing a carboxyl-containing polymer. This polymer dissolves in seawater, continuously refreshing the coating surface as exposed to the water to maintain a soil preventing effect. However, the coating contains the organotin compound generally in a large amount so as to effectively exhibit the soil preventing effect, hence the drawback of exerting an adverse influence on fishes and shellfishes.

To overcome the drawbacks described, the present applicant has proposed a method of forming soil preventing coatings with use of a composition wherein a resin having an acid anhydride group serves as a vehicle component as disclosed in Unexamined Japanese Patent Publication 99567/1990. More specifically, the resin used in this coating composition is a copolymer having a cyclic acid anhydride group in the molecule and is prepared by reacting an acid anhydride, such as itaconic anhydride or maleic anhydride, with other unsaturated monomer for radical copolymerization. The coating formed by the copolymer forms two carboxyl groups on hydrolysis and becomes soluble in water, whereas if the copolymer has a large amount of acid anhydride groups, the coating fails to retain the soil preventing effect satisfactorily over a prolonged period of time. Conversely, if the copolymer has an insufficient number of acid anhydride groups, the coating is unable to fully exhibit the soil preventing effect even for a short period of time. Thus, the proposed composition also has a drawback.

SUMMARY OF THE INVENTION

An object of the present invention is to provide a novel composition capable of forming soil preventing coatings and free of the foregoing drawbacks of the prior-art coating compositions.

Another object of the present invention is to provide a novel composition for forming soil preventing coatings which exhibit an excellent soil preventing effect over a prolonged period of time and yet produce no environmental hygienic problems.

These and other objects of the present invention will become apparent from the following description.

The present invention provides a soil preventing coating forming composition which consists essentially of a resin having at least two acid anhydride groups in the molecule on the average, the acid anhydride groups being represented by the formula

wherein R is a $C_{1-40}$ monovalent hydrocarbon group or a monovalent chain polysiloxane group represented by the formula

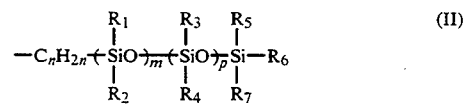

wherein $R_1$ and $R_2$ are the same or different and are each alkyl, cycloalkyl, aryl, aralkyl or

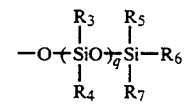

group, $R_3$, $R_4$, $R_5$, $R_6$ and $R_7$ are the same or different and are each alkyl, cycloalkyl, aryl or aralkyl, n is an integer of 1 to 6, m is an integer of 0 or 1, p is an integer of 2 to 50, and q is an integer of 0 to 50.

DETAILED DESCRIPTION OF THE PREFERRED EMBODIMENTS

The present inventor has conducted intensive research to overcome the drawbacks of the prior art and consequently found that the resin having noncyclic acid anhydride groups of the above-specified structure exhibits an excellent soil preventing effect over a prolonged period of time and yet produces no environmental hygienic problems.

The present invention has been accomplished based on this novel finding.

The $C_{1-40}$ monovalent hydrocarbon groups as mentioned herein include alkyl groups, cycloalkyl groups, aryl groups, aralkyl groups, polycyclic terpene groups, etc.

The alkyl groups as mentioned herein may be of the straight-chain or branched-chain type, and include, for example, methyl, ethyl, n-propyl, isopropyl, n-butyl, isobutyl, sec-butyl, tert-butyl, n-pentyl, isopentyl, tert-pentyl, neopentyl, n-hexyl, isohexyl, 1-methylpentyl, 2-methylpentyl, n-heptyl, 5-methylhexyl, n-octyl, 2-ethylhexyl, n-nonyl, n-decyl, n-dodecyl, n-tetradecyl, n-hexadecyl, n-octadecyl, n-eicosyl, n-hexacosyl and like groups. Suitable among these groups are those having 1 to 18 carbon atoms, especially those having tertiary carbon atoms. Useful cycloalkyl groups can generally be those having 3 to 7 carbon atoms, such as cyclopropyl, cyclobutyl, cyclopentyl, cyclopentylmethyl, cyclopentylethyl, cyclohexyl, cyclohexylmethyl, cyclohexylethyl, cycloheptyl and like groups, among which cyclopentyl and cyclohexyl are preferable.

On the other hand, useful aryl groups can be of the monocyclic or polycyclic type. Examples of monocyclic aryl groups are phenyl, toluyl, xylyl and like groups. Examples of polycyclic aryl groups are naphthyl and like groups. The aralkyl group is an alkyl group substituted with such an aryl group. Examples of aralkyl groups are benzyl, phenetyl and the like. Examples of useful polycyclic terpene groups are Pinanyl, Pinanylene, Thujenyl, Norbornyl, Abietynyl

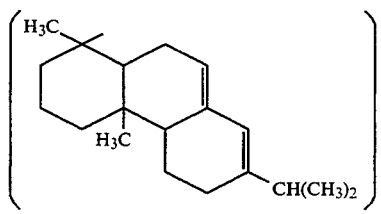

and the like.

The resins useful as the essential component of the present composition and containing noncyclic acid anhydride groups include those having acid anhydride groups of the formula (I) wherein R is a $C_{1-40}$ monovalent hydrocarbon group. Usable as such resins are, for example, resins prepared by the following processes.

(1) Resins obtained by reacting a resin containing a carboxylic acid salt with a compound having a COCl group.

(2) Resins obtained by reacting a resin having a COCl group with a compound containing a carboxylic acid salt.

(3) Resins obtained by reacting a radical-polymerizable unsaturated monomer containing a carboxylic acid salt (hereinafter referred to as the "monomer (A)") with the compound having a COCl group to prepare a radical-polymerizable unsaturated monomer containing an acid anhydride group, and thereafter subjecting the monomer singly to a radical polymerization reaction or, when required, reacting the monomer with other radical-polymerizable unsaturated monomer (hereinafter referred to as the "monomer (B)") for radical copolymerization.

(4) Resins obtained by reacting a radical-polymerizable unsaturated monomer having a COCl group (hereinafter referred to as the "monomer (C)) with the compound containing a carboxylic acid salt to prepare a radical-polymerizable unsaturated monomer containing an acid anhydride group, and thereafter subjecting the monomer singly to a radical polymerization reaction or reacting the monomer with the monomer (B) for radical copolymerization.

(5) Resins obtained by subjecting a carboxylic acid resin and a carboxyl-containing compound to a dehydration reaction.

While vinyl, polyester, alkyd and like resins are usable as carboxylic acid salt-containing resins, it is desirable to use salts of vinyl resins. More specifically stated, preferable to use are resins prepared by reacting a carboxyl-containing radical-polymerizable unsaturated monomer, such as (meth)acrylic acid, crotonic acid, itaconic acid, maleic acid, fumaric acid, carboxyethyl (meth)acrylate or 2-carboxypropyl (meth)acrylate, with the desired monomer (B) for radical polymerization to obtain a resin, and neutralizing the resin with a basic compound (such as sodium hydroxide, potassium hydroxide or like inorganic basic compound, or a tertiary amine or like organic basic compound); and resins prepared by reacting a carboxylic acid salt containing radical-polymerizable unsaturated monomer (such as the salt of (meth)acrylic acid with an alkali metal (e.g., sodium or potassium) or with an organic amine (e.g., tertiary amine) with the desired monomer (B) for radical polymerization.

The compound having a COCl group is the chloride of a monocarboxylic acid compound. Examples of suitable monocarboxylic acids are acetic acid, propionic acid, butyric acid, caproic acid, caprylic acid, capric acid, lauric acid, myristic acid, palmitic acid, VERSATIC acid (Shell Chemical Company, trademark, Synthetic Saturated acid), stearic acid, oleic acid, coconut oil fatty acid, olive oil fatty acid, palm oil fatty acid and like aliphatic acids, naphthenic acid and like alicyclic acids, benzoic acid, p-tert-benzoic acid, methylbenzoic acid and like aromatic acids, rosin and like polycyclic terpene hydrocarbon acids, etc.

The resin having a COCl group is, for example, a homopolymer of $CH_2=CHCOCl$ or copolymer thereof with a monomer (B).

Examples of suitable compounds containing a carboxylic acid salt are salts (e.g., alkali metal salts and organic salts already mentioned) of aforementioned monocarboxylic acid compounds.

Usable as monomers (A) are, for example, the above-mentioned carboxyl-containing radical-polymerizable unsaturated monomers.

Examples of useful monomers (B) are $C_{1-18}$ alkyl esters of acrylic acid or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_{2-8}$ alkenyl esters of acrylic acid or methacrylic acid, such as allyl acrylate and ally methacrylate; $C_{3-18}$ alkenyloxyalkyl esters of acrylic acid or methacrylic acid, such as allyloxyethyl acrylate and allyoxyethyl methacrylate; vinyl aromatic compounds such as styrene, alpha-methylstyrene, vinyltoluene and p-chlorostyrene; polyolefin compounds such as butadiene, isoprene and chloroprene; acrylonitrile, methacrylonitrile, methyl isopropenyl ketone, vinyl acetate, VEOVA MONOMER (product of Shell Chemical Company, trademark), vinyl propionate, vinyl pivalate, acrolein, methacrolein; etc.

These monomers (B) can be used singly, or at least two of them are usable in combination.

It is desirable to chiefly use $C_{1-18}$ alkyl esters of acrylic acid or methacrylic acid and styrene as the monomer (B) since these monomers are readily amenable to radical polymerization and provide coatings which are excellent in strength and resistance to salt water.

Examples of useful monomers (C) are $CH_2=CHCOCl$, etc.

When the compound containing a COCl group and the compound containing a carboxylic acid salt comprise a substituted or unsubstituted benzoic acid as the monocarboxylic acid compound component thereof, the acid assures the advantage that the coating obtained has moldproofing and bactericidal properties imparted thereto.

The radical polymerization reaction and the reaction for forming an acid anhydride group (reaction between COCl group and carboxylic acid salt) can be carried out by known methods. For example, the radical polymerization reaction can be carried out in an inert organic solvent in the presence of a polymerization catalyst (e.g., azo compound, peroxide compound or diazo compound) usually with heating at 60° to 200° C. Examples of useful inert organic solvents are ethylene glycol dimethyl ether and like ethers; toluene, xylene and like aromatic hydrocarbons; ethyl acetate and butyl acetate and like esters; cyclohexanone, methyl isobutyl ketone and like ketones; etc. The acid anhydride group forming reaction can be effected in such an inert organic solvent at room temperature or with heating.

The resins containing noncyclic acid anhydride groups for use as the essential component of the composition of the present invention further include those having acid anhydride groups of the formula (I) wherein R is alternatively a monovalent chain polysiloxane group of the formula (II). Usable as such resins are, for example, those prepared by the following processes.

(6) Resins obtained by subjecting a carboxylic acid resin and a carboxyl-containing silicon compound to a dehydration reaction.

(7) Resins obtained by reacting a resin containing a carboxylic acid salt with a silicon compound containing a COCl group.

(8) Resins obtained by reacting a resin having a COCl group with a silicon compound containing a carboxylic acid salt.

(9) Resins obtained by reacting a radical-polymerizable unsaturated monomer containing a carboxylic acid salt (monomer (A)) with the silicon compound containing a COCl group to prepare a radical-polymerizable unsaturated monomer containing a chain acid anhydride group, and thereafter subjecting the monomer singly to a radical polymerization reaction or, when required, reacting the monomer with other radical-polymerizable unsaturated monomer (monomer (B)) for radical copolymerization.

(10) Resins obtained by reacting a radical-polymerizable unsaturated monomer having a COCl group (monomer (C)) with the silicon compound containing a carboxylic acid salt to prepare a radical-polymerizable unsaturated monomer containing a chain acid anhydride group, and thereafter subjecting the monomer singly to a radical polymerization or reacting the monomer with the monomer (B) for radical copolymerization.

While vinyl, polyester, alkyd and like resins are usable as the carboxylic acid resin, it is desirable to use vinyl resin. More specifically, suitable to use are resins prepared by reacting a carboxyl-containing radical-polymerizable unsaturated monomer, such as (meth)acrylic acid, crotonic acid, itaconic acid, maleic acid, fumaric acid, carboxyethyl (meth)acrylate or 2-carboxypropyl (meth)acrylate, with the desired monomer (B) for radical polymerization.

Useful resins containing a carboxylic acid salt are those already mentioned.

The COCl group-containing resin to be used is any of those already mentioned.

The monomer (A), the monomer (B) and the monomer (C) usable are also those already mentioned.

The carboxyl-containing silicon compound is not limited specifically insofar as it has at least one carboxyl group and at least one polysiloxane group in the molecule. Preferable as such compounds are those represented by the following formula.

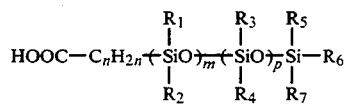

wherein $R_1$, $R_2$, $R_3$, $R_4$, $R_5$, $R_6$ and $R_7$, n, m and p are each as defined above.

More specifically, the carboxyl-containing silicon compound is, for example,

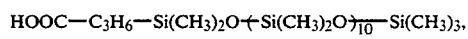

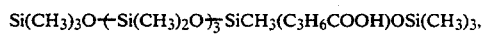

The COCl (group-containing silicon compound to be used is, for example, a compound obtained by reacting the carboxyl-containing silicon compound with a compound such as phosphorus pentachloride or thionyl chloride.

The carboxylic acid salt-containing silicon compound usable is, for example, one obtained by neutralizing the carboxyl-containing silicon compound with the above-mentioned basic compound.

The radical polymerization reaction and the acid anhydride group forming reaction involved in preparing the resins (6) to (10) can be carried out in the same manner as in the case of the resins (1) to (5).

The resin for use in the composition of the present invention has at least two, preferably at least four, acid anhydride groups of the formula (I) per molecule on the average. If the number of acid anhydride groups is less than two on the average, the resin will have the drawback of failing to dissolve in water even when hydrolyzed, to permit the coating to be refreshed by abrasion and to retain satisfactory soil preventing properties over a prolonged period of time. Although the upper limit of the number of acid anhydride groups is not determined specifically, it is usually about 150 per molecule on the average.

The resin can be about 3,000 to about 200,000, preferably about 5,000 to about 80,000, in number-average molecular weight. When less than 3,000 in number-average molecular weight, the resin is inferior in long-term soil preventing effect, whereas if greater than 200,000, the resin is not amenable to hydrolysis, will not permit the coating to dissolve out smoothly and to exhibit a sufficient soil preventing effect, and is therefore undesirable.

Known soil preventing agents can be incorporated into the composition of the invention in accordance with the properties required thereof. Such agents include, for example, copper soil preventing agents such as copper suboxide, thiocyan copper and copper powder, organotin soil preventing agents such as triphenyltin fluoride, triphenyltin chloride and tributyltin oxide, nitrogen-containing sulfur soil preventing agents such as ethylenebis(dithiocarbamic acid)zinc and tetramethylthiuram disulfide, zinc oxide, etc. When required, a copolymer having a trialkyltin compound on the side chain is also usable in combination with such agents.

Besides these soil preventing agents, extender pigments, coloring pigments, plasticizers, additives for coating compositions and other resins can also be incorporated into the present composition.

The composition of the invention exhibits an excellent soil preventing effect when applied to the base materials of buildings and underwater structures which need to be prevented from soiling. The composition is applied, for example, to the interior of housing facilities, and buildings which need to provide a biologically clean environment, such as hospitals, breweries, food factories (e.g., bakeries), pharmaceutical production factories, electronic apparatus production factories, etc., whereby the environment can be effectively prevented from biological contamination. The composition is applicable also to underwater structures (e.g., ships, harbor facilities, buoys, pipelines, bridges, submarine facilities, culture nets and fish trapping nets) for preventing deposition and growth of underwater organisms. When applied to underwater structures, the composition provides a coating which retains an excellent soil preventing effect over a prolonged period of time and which is nevertheless very safe to the human body. When the composition is to be applied to underwater structures, it is generally desirable to apply a zinc-epoxy shop primer or epoxy-rubber chloride corrosion inhibiting base coat composition to the substrate first and subsequently apply the composition to the coating.

The composition can be applied to the surface of substrate, for example, by brush coating, spray coating, roller coating or dipping. Although not limited specifically, the amount of application is generally in the range of 5 to 400 g/m$^2$. Although the coating can be dried at room temperature, the coating may be heated at a temperature of up to about 200° C. for drying when required.

The composition of the present invention exhibits a superior long-term soil preventing effect compared to the conventional composition wherein a resin having a cyclic acid anhydride group is used as a vehicle component, presumably for the following reason.

When the coating containing the resin having noncyclic acid anhydride groups of the formula (I) is immersed in water, the acid anhydride groups hydrolyze to release a monocarboxylic acid compound and form a carboxyl-containing resin. The release of the monocarboxylic acid compound prevents deposition of underwater organisms on the coating, and the carboxyl-containing resin refreshes the coating, causing the coating to produce a soil preventing effect.

Furthermore, the monovalent hydrocarbon group R of the formula (I), when given an increased number of carbon atoms, imparts increased hydrophobicity to the coating to lower the rate of dissolving out of the monocarboxylic acid, whereas a decrease in the number of carbon atoms of the group gives enhanced hydrophilicity to the coating to cause the coating to dissolve out at a higher rate. Thus, the rate of dissolving out of the coating is adjustable as desired.

Further in the case where R in the formula (I) is a monovalent chain polysiloxane group of the formula (II), the polysiloxane inhibits penetration of water into the coating, whereas when the acid anhydride groups start to hydrolyze, the resulting carboxyl-containing silicon compound rapidly diffuses through water and separates off the resin, permitting the coating to exhibit an excellent soil preventing effect over a long period of time.

The present invention will be described in greater detail with reference to the following examples. Examples in the case where R of the formula (I) is a monovalent hydrocarbon group Monomer Preparation Example A 86-g quantity of methacrylic acid and 50 g of deionized water were placed into a four-necked flask equipped with a stirrer, thermometer and reflux tube. An aqueous solution of 40 g of sodium hydroxide in 50 g of deionized water was further placed dropwise into the flask. When the mixture ceased evolving heat, 400 g of toluene was added to the mixture, the mixture was heated, and water was removed therefrom under reflux by a water separator. The mixture was thereafter cooled to room temperature, 78.5 g of acetyl chloride was added dropwise thereto, and the mixture was reacted for 1 hour and then filtered to obtain a colorless transparent monomer solution.

Vinyl Polymer Preparation Example 1

A 90-g quantity of xylene was placed into the same device as used in the above example. A mixture of 100 g of the monomer solution as concentrated to 50 wt. %, 50 g of methyl methacrylate and 3 g of azobisisobutyronitrile was added dropwise to the xylene over a period of 2 hours, followed by reaction at 100° C. with stirring for 1 hour. Thereafter 1 g of azobisisobutyronitrile and 10 g of xylene were added to the mixture over a period of 1 hour for a further reaction to obtain a light yellow viscous liquid containing 50 wt. % of solids. The polymer thus prepared was 18,000 in number-average molecular weight and had about 70 acid anhydride groups per molecule.

Vinyl Polymer Preparation Example 2

A 100-g quantity of toluene and 107.6 g of butyl acetate were placed into the same device as used above, and a mixture of 7.2 g of acrylic acid, 52.8 g of n-butyl methacrylate, 40 g of ethyl acrylate and 2 g of benzoyl peroxide was added dropwise to the mixture over a period of 2 hours, followed by reaction at 100° C. with stirring for 1 hour. Thereafter 1 g of benzoyl peroxide and 50 g of toluene were added to the mixture over a period of 1.5 hours for a further reaction. The reaction mixture was cooled to 80° C., 11.2 g of 50 wt. % aqueous solution of potassium hydroxide was then added thereto, the mixture was heated, and water was separated off under reflux by a water separator. The reaction mixture was thereafter cooled to 50° C., stirred for 3 hours with addition of 14.1 g of benzoyl chloride and subsequently decanted to obtain a light yellow viscous liquid containing 30 wt. % of solids. The polymer thus prepared was 9,000 in number-average molecular weight and had about 9 acid anhydride groups per molecule.

Vinyl Polymer Preparation Example 3

A mixture was prepared from 25 g of maleic anhydride, 25 g of styrene, 30 g of methyl methacrylate, 20 g of ethyl acrylate, 43 g of xylene, and 2.0 g of benzoyl peroxide and reacted at 90° to 100° C. with stirring for 3 hours. With addition of 1.0 g of benzoyl peroxide and 107 g of xylene, the mixture was further reacted at 90° to 100° C. with stirring for 2 hours to obtain a light yellow viscous liquid containing 40 wt. % of solids. The polymer thus prepared was 30,000 in number-average molecular weight and had about 75 acid anhydride groups per molecule.

EXAMPLE 1

A 50.0-g quantity of the copolymer solution (solids content 50 wt. %) of Vinyl Polymer Preparation Example 1, 30.0 g of copper suboxide, 2.0 g of iron-oxide red, 0.5 g of Aerosil #200 (trademark for silica powder manufactured by Degussa AG., Germany, same as hereinafter) and 11.0 g of xylene were mixed together in a paint conditioner for dispersion to obtain a soil preventing coating composition.

EXAMPLE 2

A 80.0-g quantity of the copolymer solution (solids content 30 wt. %) of Vinyl Polymer Preparation Example 2, 30.0 g of copper suboxide, 3.0 g of calcium carbonate, 0.5 g of Aerosil #200 and 2.5 g of xylene were made into a soil preventing coating composition in the same manner as in Example 1.

COMPARATIVE EXAMPLE 1

A coating composition was prepared in the same manner as in Example 1 from 10 g of vinyl chloride resin, 10 g of rosin, 4 g of tricresyl phosphate, 10 g of triphenyltin fluoride, 5 g of calcium carbonate, 5 g of iron-oxide red, 28 g of xylol and 28 g of methyl isobutyl ketone.

COMPARATIVE EXAMPLE 2

In the same manner as in Example 1, a coating composition was prepared from 5 g of rubber chloride resin, 15 g of rosin, 4 g of tricresyl phosphate, 30 g of copper suboxide, 5 g of calcium carbonate, 3 g of barium carbonate, 4 g of iron-oxide red and 34 g of xylol.

COMPARATIVE EXAMPLE 3

A composition was prepared in the same manner as in Example 1 except that 62.5 g of the copolymer solution of Vinyl Polymer Preparation Example 3 was used in place of 50 g of the copolymer solution of Vinyl Polymer Preparation Example 1.

Soil Preventing Property Test

Sandblasted steel panels measuring 100×300×2 mm and precoated with a zinc-epoxy shop primer (dry coating thickness 15 μm) and with an epoxy corrosion inhibiting coating composition (dry coating thickness 200 μm) were coated with each of the coating compositions obtained in Examples 1 and 2 and Comparative Examples 1 to 3 to a thickness of 100 μm when dried, and then dried for 7 days to prepare test panels.

The test panels were immersed in seawater at Toba Bay, Mie Prefecture, Japan for 24 months and tested for soil preventing properties. The results are shown in Table 1 (in which each value represents the area of deposition of organisms in percentage).

TABLE 1

| | Period of immersion | | |
|---|---|---|---|
| | 12 months | 18 months | 24 months |
| Example 1 | 0 | 0 | 0 |
| Example 2 | 0 | 0 | 0 |

TABLE 1-continued

| | Period of immersion | | |
|---|---|---|---|
| | 12 months | 18 months | 24 months |
| Comp. Ex. 1 | 10 | 30 | — |
| Comp. Ex. 2 | 0 | 15 | — |
| Comp. Ex. 3 | 0 | 0 | 10 |

Examples in the case where R of the formula (I) is a monovalent chain polysiloxane group of the formula (II) Monomer Preparation Example A 86-g quantity of methacrylic acid and 50 g of deionized water were placed into a four-necked flask equipped with a stirrer, thermometer and reflux tube. An aqueous solution of 40 g of sodium hydroxide in 50 g of deionized water was further placed dropwise into the flask. When the mixture ceased evolving heat, 400 g of toluene was added to the mixture, the mixture was heated, and water was removed therefrom under reflux by a water separator. The mixture was thereafter cooled to room temperature, 992 g of $ClOCC_3H_6Si(CH_3)_2O—Si(CH_3)_2O)_{10}Si(CH_3)_3$ was added dropwise thereto, and the mixture was reacted for 1 hour and then filtered to obtain a colorless transrparent monomer solution.

Vinyl Polymer Preparation Example 4

A 68-g quantity of xylene was placed into the same device as used in the above monomer preparation example. A mixture of 44 g of the monomer solution as concentrated to 50 wt %, 40 g of methyl methacrylate, 38 g of ethyl acrylate and 3 g of azobisisobutyronitrile was added dropwise to the xylene over a period of 2 hours, followed by reaction at 100° C. with stirring for 1 hour. Thereafter 1 g of azobisisobutyronitrile and 10 g of xylene were added to the mixture over a period of 1 hour for a further reaction to obtain a light yellow viscous liquid containing 50 wt. % of solids. The polymer thus prepared was 10,000 in number-average molecular weight and had about two acid anhydride groups per molecule.

Vinyl Polymer Preparation Example 5

A 100-g quantity of toluene and 107.6 g of butyl acetate were placed into the same device as used above, and a mixture of 7.2 g of acrylic acid, 52.8 g of n-butyl methacrylate, 40 g of ethyl acrylate and 3 g of azobisisobutyronitrile was added dropwise to the mixture over a period of 2 hours, followed by reaction at 100° C. with stirring for 1 hour. Thereafter 1 g of benzoyl peroxide and 50 g of toluene were added to the mixture over a period of 1.5 hours for a further reaction. The reaction mixture was cooled to 80° C., 11.2 g of 50 wt. % aqueous solution of potassium hydroxide was then added thereto, the mixture was heated, and water was separated off under reflux by a water separator. The reaction mixture was thereafter cooled to 50° C., stirred for 3 hours with addition of 26 g of $Si(CH_3)O$–$(Si(CH_3)_2O)_{15}SiCH_3$ $(C_3H_6COCl)OSi(CH_3)_3$ and subsequently decanted to obtain a light yellow viscous liquid containing 50 wt. % of solids. The polymer thus prepared was 10,000 in number-average molecular weight and has about four acid anhydride groups per molecule.

EXAMPLE 3

A 50.0-g quantity of the copolymer solution (solids content 50 wt. %) of Vinyl Polymer Preparation Example 4, 30.0 g of copper suboxide, 2.0 g of iron-oxide red, 0.5 g of Aerosil #200 and 11.0 g of xylene were mixed together in a paint conditioner for dispersion to obtain a soil preventing coating composition.

EXAMPLE 4

A 50.0-g quantity of the copolymer solution (solids content 50 wt. %) of Vinyl Polymer Preparation Example 5, 30.0 g of copper suboxide, 3.0 g of calcium carbonate, 0.5 g of Aerosil #200 and 2.5 g of xylene were made into a soil preventing coating composition in the same manner as in Example 1.

COMPARATIVE EXAMPLE 4

A composition was prepared in the same manner as in Example 3 except that 62.5 g of the copolymer solution of Vinyl Polymer Preparation Example 3 was used in place of 50 g of the copolymer solution of Vinyl Polymer Preparation Example 4.

Soil Preventing Property Test

The coating compositions prepared in Examples 3 and 4 and Comparative Example 4 were tested for soil preventing properties in the same manner as above. The results are shown in Table 2 (in which each value represents the area of deposition of organisms in percentage).

TABLE 2

|  | Period of immersion | | |
|---|---|---|---|
|  | 12 months | 18 months | 24 months |
| Example 3 | 0 | 0 | 0 |
| Example 4 | 0 | 0 | 0 |
| Comp. Ex. 4 | 0 | 0 | 10 |

We claim:

1. A method of rendering an underwater surface resistant to the deposition of marine organisms comprising coating the surface with a composition which consists essentially of a soil preventing agent and a resin having at least two acid anhydride groups in the molecule on the average, the acid anhydride groups being represented by the formula

wherein R is a a monovalent chain polysiloxane group represented by the formula

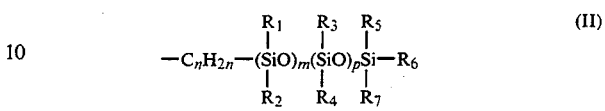

wherein R, and $R_2$ are the same or different and are each alkyl, cycloalkyl, aryl, aralkyl or

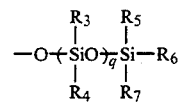

group, $R_3$, $R_4$, $R_5$, $R_6$ and $R_7$ are the same or different and are each alkyl, cycloalkyl, aryl or aralkyl, n is an integer of 1 to 6, m is an integer of 0 or 1, p is an integer of 2 to 50, and q is an integer of 0 to 50.

2. A method for rendering an underwater surface resistant to the deposition of marine organisms as defined in claim 1 wherein the molecule of the resin on the average has at least four acid anhydride groups in formula (I).

3. A method for rendering an underwater surface resistant to the deposition of marine organisms as defined in claim 1 wherein the resin has a number-average molecular weight of about 3,000 to about 200,000.

4. A method of rendering an underwater surface resistant to the deposition of marine organisms as defined in claim 1, wherein the molecule of the resin has up to about 150 acid anhydride groups in formula (I).

5. A method of rendering an underwater surface resistant to the deposition of marine organisms as defined in claim 1, wherein the resin has a number-average molecular weight of about 5,000 to about 80,000.

6. A method of rendering an underwater surface resistant to the deposition of marine organisms as defined in claim 1, wherein the step of coating the surface includes applying 5–400 g/m² to the surface.

* * * * *